United States Patent Office 3,517,904
Patented June 30, 1970

3,517,904
OBJECT POSITIONING SUPPORT ALLOWING FOR MULTIPLE DISPLACEMENTS
Jacques Verchain, La Celle-Saint-Cloud, France, assignor to Compagnie Generale d'Electricite, Paris, France, a French corporation
Filed June 28, 1968, Ser. No. 740,958
Claims priority, application France, June 30, 1967, 112,757
Int. Cl. F16m 13/00
U.S. Cl. 248—324            1 Claim

ABSTRACT OF THE DISCLOSURE

An object positioning support permitting small elementary and independent rectilineal and rotational displacements by employing a stack of relatively movable plates wherein two opposite plate surfaces are planar for achieving rectilinear horizontal displacement and two other opposite plate surfaces are curved for achieving rotational displacement in a horizontal pivot.

---

This invention relates to a rest or support which permits the adjustable positioning of an object by displacing the same at about a plurality of axes in either rectilinear translation or rotation, in response to the action of multiple control members integral with the apparatus.

Multiple displacement rests or supports are known, for example object-slides or machine tooled tool posts are actuated in general, by combinations of screw threaded rods and nuts which are able to impart considerable displacement movements to these devices. For instance, a milling head may be displaced while rotating about one or two axes and it is further possible to raise or lower the milling head but in general, these devices cannot effect other displacement movements.

The device according to the present invention is not designed to transmit considerable forces or torques, but merely to position, in the static sense, an object of moderate weight, although (with appropriate dimensioning) the invention has application to heavy loads. The apparatus according to the invention will preferably be employed in laboratories, for example in an optical laboratory where a device such as a laser or the like requires precise positioning on an optical bench relative to isolated optical members. Of course, the invention is not lmiited to such applications.

The invention is intended, essentially, for displacements of small amplitude, for example movements of translation of a few millimeters, and movements of rotation through a few degrees. Thus, it is suitable for the "finishing" step in a positioning sequence which is roughly adjusted by other means.

According to the invention, a rest or support for the positioning of an object permitting a multiplicity of small elementary displacements, independent of each other, is constituted by a stack of plates, each of which is capable of effecting an elementary displacement relative to the plate immediately below it. With respect to any two plates, two opposite surfaces are planar for rectilinear horizontal displacement and two opposite surfaces are curved for displacement involving rotation about a horizontal axis.

According to a further feature, a plate, called a drive plate, is provided with an upwardly or downwardly oriented lug, the lug carrying a screw thread and a screw, the end of which abuts the edge of the plate immediately above or below it (called the driven plate) one surface of which, which is oriented toward the drive plate, carries a projection in which a projection on the drive plate engages. Thus, it will be clear that every actuation will result in a constrained displacement between a driven plate and an associated drive plate and as far as the end plate is concerned, the displacement of which will represent the integration of displacement of the individual plates.

It should be mentioned here that, since there may be imparted to the lower plates, orientations of any desired nature, in accordance with any movements which are compatible, the rod, carried by the end plate is generally not strictly in a vertical reference position, but in a position which is approximately vertical. In this connection, it should be recalled that the displacements provided are of small amplitude.

It should further be appreciated that the vertical orientation of the stack of plates and the approximately vertical orientation of the rod are merely preferred positions, and other positions being possible within the framework of the invention. However, this orientation will obviously be adopted in a great majority of cases.

Most frequently, the end plate will be the upper plate and the object to be positioned being carried by the lower end of the vertical rod which extends from the upper plate to a position below the lower plate.

It will be clear that the apparatus is of strictly "recurrent" type of structure and might, optionally, contain a large number of plates if it should be desired to impart to an object multiple elementary displacements relative to a large number of axes. The number of elementary displacements will most frequently be limited to a few units, with a corresponding number of plates. In principle, all positioning problems should be capable of solution by means of three movements of translation, parallel to three axes (preferably rectangular) and three movements of rotation about the same axes.

The invention will now be discussed in more detail with the aid of examples which are given in a non-limited sense with reference to the accompanying drawings, wherein.

Figure 1:
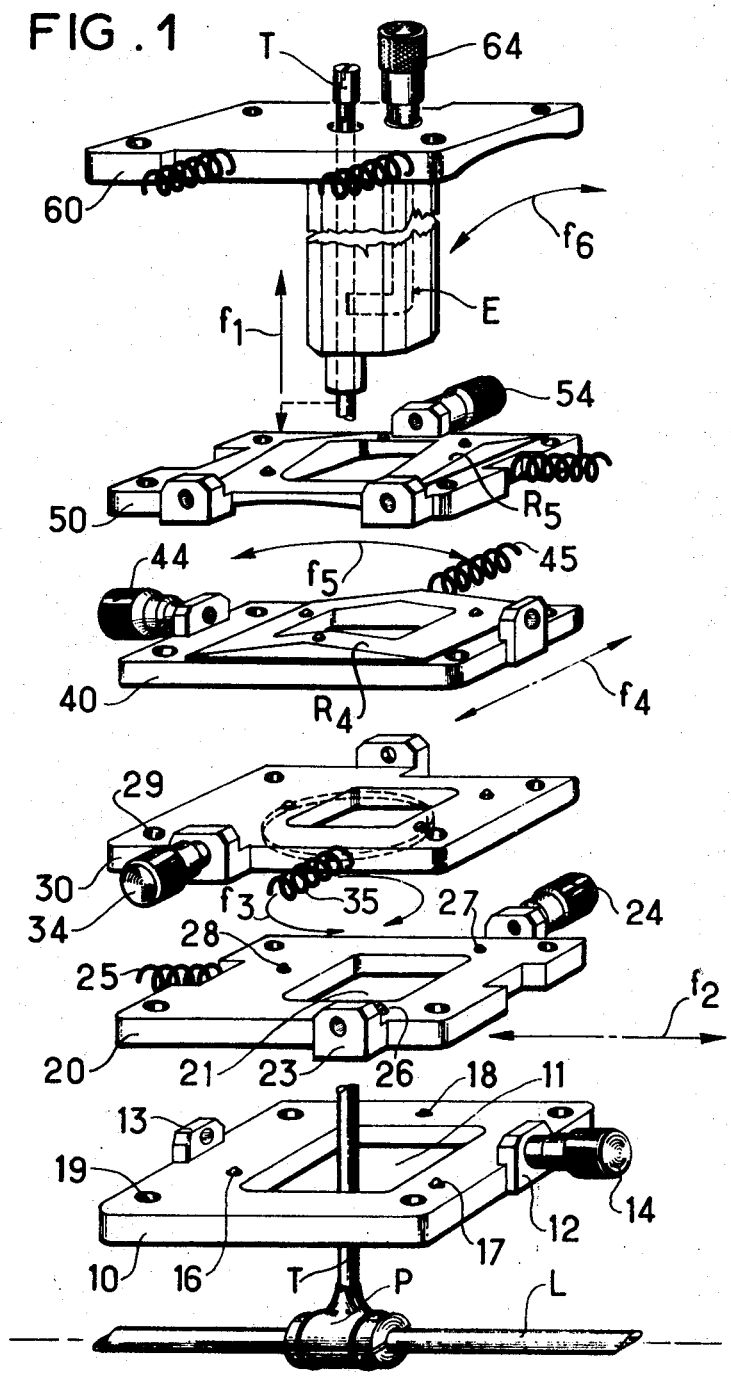
FIG. 1 is a diagrammatic, exploded view of a positioning support or rest providing six elementary displacements.

Turning to the drawings, FIG. 1 is an exploded view of one example of a rest or support formed according to the present invention, the support employing six stacked plates having the reference numerals (counting in the upward direction) 10, 20, 30, 40, 50 and 60.

All of the plates have, in common, a generally rectangular shape and they exhibit the same overall dimensions. All of the plates, with the exception of the upper plate 60, comprise:

A central recess 1 through which extends a rod T carried on the upper plate 60;

A drive lug 2 secured to a first side of the plate, is upwardly oriented, screw threaded and carries a micrometer drive screw 4, the inner end of which is adapted to bear on a corresponding side of the plate immediately above it;

An abutment lug 3 is secured on the side of the plate parallel to and opposite the first side and is provided with a blind aperture which bears on a recall spring 5, the spring bearing on its opposite end the side of the plate immediately above. However, as an exception, the plate 50 has two abutment lugs and two recall springs;

Three balls 6, 7 and 8 are crimped on the upper face of the plates, the upper hemisphere of the balls being relieved;

Each plate is provided with four holes, one at each corner.

These elements have the following reference numerals as given above:

Central recess 1; drive lug 2; abutment lug 3; drive screw 4; spring 5; and balls 6, 7 and 8.

The corresponding references are 11 to 19 for plate 10, 21 to 29 for plate 20, and so on, as far as plate 50 is concerned in ascending order. In order not to overload the figure, the references are shown only with respect to the two lower plates.

The plates 20 to 60 are formed, in the lower face, with a triangular section groove in which are inserted two of the balls of the plate immediately underneath, with the exception of plate 30 which is formed with a groove of circular shape into which are introduced the three balls of plate 20. The plates 20, 40, 50 and 60 are formed with a notch in which the third ball of the underneath plate is lodged.

These grooves and notches are not shown in FIG. 1. On the other hand, there are shown at the side, arrows indicating the direction of each groove, that is, the rectilinear arrow $f_2$ from left to right for plate 20 indicates the direction of its particular groove. The circular arrow $f_3$ which extends in a horizontal plane shows the position of the groove which in effect is shown in dotted line form while the rectilinear arrow $f_4$ extending from front to rear for plate 40 defines the groove carried thereby. The circular arrow $f_5$ in the first vertical plane for plate 50, and the circular arrow $f_6$ in a vertical plane perpendicular to the preceding plane for plate 60 shows the grooves carried by plates 50 and 60 respectively allowing rotation of these plates about respective horizontal axes.

The plate 60 carries a micrometer screw 64, the axis of which is vertical. The micrometer screw 64 communicates its movement through the intermediary of appropriate counter-gearing E (shown in broken lines in FIG. 1). This rod T extends through the central recesses 11, 21, etc. in all the plates and carries at its lower end a gripper P which grasps an object to be positioned, for example, a laser tube L. Under the effect of the adjustment of screw 64, the rod T is able to travel in the vertical direction in accordance with arrow $f_1$.

For reasons of topology, the upper faces of plates 40 and 50 carry protuberances $R_4$ and $R_5$. Since the plates are in stacked position and in contact with each other, as will be seen by referring to FIG. 3, a movement affecting one plate is transmitted to the portion of the structure above this plate.

If the screw 14 is manipulated, a rectilinear movement or displacement in the direction of arrow $f_2$ is imparted to the plate 20 and this displacement is transmitted to the plates 30, 40, 50 and 60.

By manipulating the screw 24, a movement in the form of a circular displacement in the horizontal plane and in the direction shown by arrow $f_3$ is imparted to the plate 30, and this displacement is transmitted to the plates 40, 50 and 60.

By manipulating the screw 34, a movement in the form of a rectilinear displacement in the direction of arrow $f_4$ is imparted to the plate 40 and this displacement is transmitted to plates 50 and 60.

By manipulating the screw 44, there is imparted to the plate 50 a movement in the form of a circular dipslacement in the direction of arrow $f_5$, this displacement being transmitted to plate 60.

Again, by manipulating the screw 54, a movement in the form of a circular displacement in the direction of arrow $f_6$ is imparted to the plate 60. The integration of these five elementary displacements constitutes a displacement of plate 60 which is transmitted by the plate 60 to rod T. By manipulating the screw 64, a further movement in the form of a displacement in the direction of arrow $f_1$ is imparted to the rod T. When all these adjustments have been achieved, the rod T is no longer strictly vertical, but only approximately vertical. Again, it will be recalled that the displacements effected are generally small.

Figure 2:
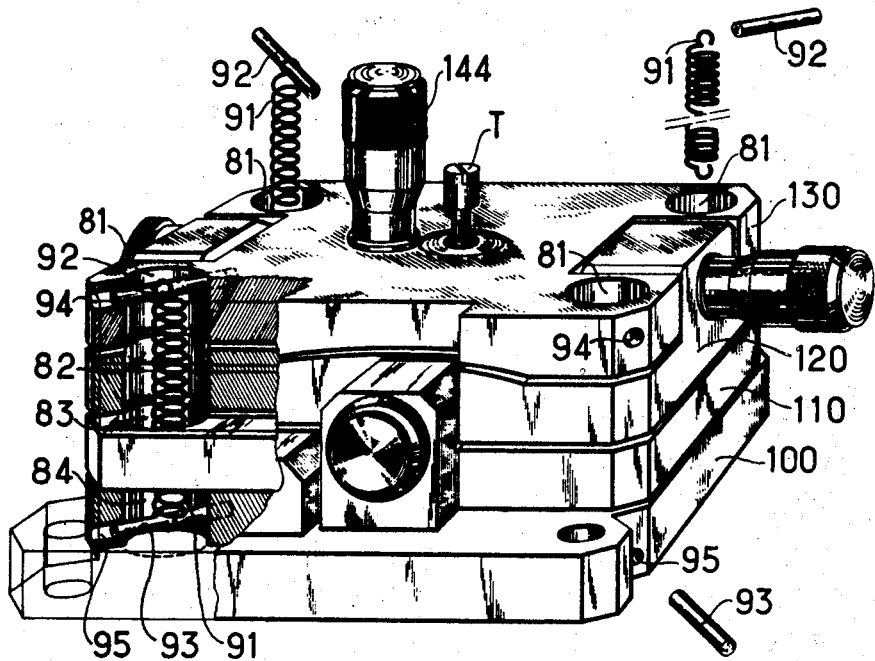
FIG. 2 is a perspective view, in partial section, of an alternate embodiment stressing the mechanical association of the various individual plate elements of the rest.

Turning to FIG. 2, there is shown a device having four plates 100, 110, 120 and 130, permitting four displacements. The connections between the plates are shown by the partial sectional illustration. The superposed holes 81, 82, 83, and 84 in the corresponding corners of the four plates form a "well" in which is lodged a coil spring 91 maintained above and below transverse rods 92 and 93 respectively, the ends of the rods extending into apertures 94 and 95 with the transverse apertures being carried by the upper plate 130 and the lower plate 100 respectively. The identical construction is provided at all four corners of the apparatus. Screw 144 fulfills the same function as screw 64 in the embodiment of FIG. 1.

Figure 3:
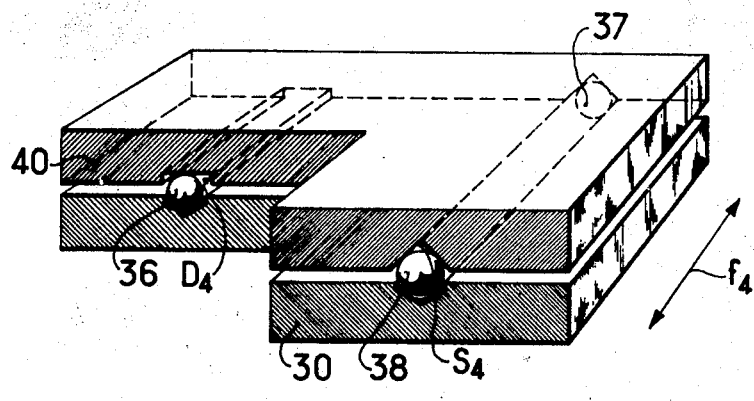
FIG. 3 is a perspective view, drawn to a larger scale, showing the mode of guiding one plate support element relative to an adjacent plate support element.

FIG. 3 shows, to a larger scale, the arrangement of the balls which are crimped in the plate and are positioned in the grooves carried by the upper plate. The assembly, comprising plates 30 and 40 of the embodiment of FIG. 1.

The balls 36, 37 and 38 are crimped in plate 30 at the apices of a triangle. The plate 40 which is required to be displaced by translation in the direction of arrow $f_4$, and parallel to plate 30, bears on the balls 37 and 38 through the intermediary of lateral grooves. The two lateral faces of grooves $S_4$ which is of triangular section, results in point contact between the lateral faces and each of the balls 37 and 38. The ball 36 serves purely as a reference element for maintaining the plate 40 at a constant distance from plate 30 this being achieved by friction on the bottom of groove $D_4$ which in this embodiment is of rectangular section. Similar arrangements are provided for all of the plates, with the exception of plate 50 which is formed with a circular, horizontal groove in which the three balls carried by plate 40 engage.

While the apparatus has been particularly shown and described with reference to preferred embodiments, it will be understood by those skilled in the art that the foregoing and other changes in form and detail may be made therein without departing from the spirit and scope of the invention.

What is claimed is:

1. An object positioning support permitting elementary independent rectilinear and rotational displacements comprising: a stack of plates, means allowing elementary displacement of the plates with respect to the plate immediately therebelow, two opposed surfaces of adjacent plates being planar for horizontal displacement, and two opposed surfaces of adjacent plates being curved for relative rotational displacement about the horizontal pivot axis, a first lug carried by one of said plates, an adjusting screw carried by said lug, one end of which is in contact with the adjacent plate, a second lug carried by said plate opposite said first lug, and resilient means interposed between said adjacent plate and second lug for resisting adjustable movement of said adjacent plate in response to displacement of said adjustment screw, axially aligned holes carried by said plates at the corners thereof, transverse pins extending across the holes of said outer plates, and a tension spring carried between said pins for resiliently maintaining said plates in stacked relationship.

References Cited

UNITED STATES PATENTS

| | | | |
|---|---|---|---|
| 2,614,452 | 10/1952 | Coote et al. | 350—173 |
| 2,723,821 | 11/1955 | Kelly et al. | 248—179 |
| 3,396,932 | 8/1968 | Slaga | 248—349 |
| 3,400,266 | 9/1968 | Yoder et al. | |

ROY D. FRAZIER, Primary Examiner

J. F. FOSS, Assistant Examiner

U.S. Cl. X.R.

248—179; 350—81